(12) United States Patent
Yoo et al.

(10) Patent No.: US 7,471,347 B2
(45) Date of Patent: Dec. 30, 2008

(54) LIQUID CRYSTAL DISPLAY DEVICE AND METHOD FOR MANUFACTURING THE SAME

(75) Inventors: Hong Suk Yoo, Kyonggi-do (KR); Woo Hyun Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 12 days.

(21) Appl. No.: 10/026,477

(22) Filed: Dec. 27, 2001

(65) Prior Publication Data

US 2002/0105603 A1 Aug. 8, 2002

(30) Foreign Application Priority Data

Dec. 28, 2000 (KR) .......................... 2000-0084092

(51) Int. Cl.
*G02F 1/1343* (2006.01)
(52) U.S. Cl. ...................................................... 349/38
(58) Field of Classification Search ................... 349/38, 349/39
See application file for complete search history.

(56) References Cited

U.S. PATENT DOCUMENTS

| | | | | |
|---|---|---|---|---|
| 5,815,226 A | * | 9/1998 | Yamazaki et al. | 349/111 |
| 6,106,907 A | * | 8/2000 | Yoshikawa et al. | 428/1.1 |
| 6,133,967 A | * | 10/2000 | Moon | 349/39 |
| 6,545,730 B1 | * | 4/2003 | Hwang | 349/43 |
| 6,583,828 B1 | * | 6/2003 | Wada et al. | 349/39 |
| 6,606,137 B2 | * | 8/2003 | Lee | 349/106 |

FOREIGN PATENT DOCUMENTS

| | | |
|---|---|---|
| KR | 1996-16796 | 3/1993 |
| KR | 2000-19893 | 4/2000 |

* cited by examiner

*Primary Examiner*—Timothy Rude
(74) *Attorney, Agent, or Firm*—McKenna Long & Aldridge LLP

(57) ABSTRACT

An LCD device and a method for manufacturing the same are disclosed, in which a width of a gate line is decreased by forming a storage capacitor of a high capacitance with a small area, and by improving an aperture ratio, thereby obtaining high picture quality.

10 Claims, 9 Drawing Sheets

LIQUID CRYSTAL DISPLAY DEVICE AND METHOD FOR MANUFACTURING THE SAME

This application claims the benefit of Korean Patent Application No. 2000-84092 filed on Dec. 28, 2000, which is hereby incorporated by reference as if fully set forth herein.

BACKGROUND OF THE INVENTION

1. Field of the Invention

The present invention relates to a liquid crystal display (LCD) device, and more particularly, to an LCD device and a method for manufacturing the same.

2. Discussion of the Related Art

Rapid development within the fields of information and communication has caused an increase in the demand for thin, lightweight and low cost display devices for viewing information. Industries that develop displays are responding to these needs by placing a high emphasis on developing flat panel type displays.

Historically, the Cathode Ray Tube (CRT) has been widely used as a display device in applications such as televisions, computer monitors, and the like, because CRT screens can display various colors having high luminance. However, the CRT cannot adequately satisfy present demands for display applications that require reduced volume and weight, portability, and low power consumption while having a large screen size and high resolution. Based on this need, the display industry has a placed high emphasis on developing flat panel displays to replace the CRT. Over the years, flat panel displays have been widely used in monitors for computers, spacecraft, and aircraft. Examples of flat panel display types currently used include the LCD, the electro luminescent display (ELD), the field emission display (FED), and the plasma display panel (PDP).

Characteristics required for an ideal flat panel display include a lightweight, high luminance, high efficiency, high resolution, high speed response time, low driving voltage, low power consumption, low cost, and natural color.

An LCD device having a thin and small size has been recently developed to sufficiently serve as a flat panel display device. Thus, demand for the LCD device is increasing.

Such an LCD device is based on the electric optical characteristic of a liquid crystal (LC) injected within a panel and the device does not emit light in unlike a plasma display panel (PDP) or a field emission display (FED). Accordingly, to view a picture displayed in an LCD panel, a separate light source, i.e., a back light assembly for uniformly irradiating light to a display panel of a picture is required.

Hereinafter, a related art LCD display and a method for manufacturing the same will be explained with reference to the accompanying drawings.

FIG. 1 is a plan view of a related art LCD device. Referring to FIG. 1, a gate line 11 is formed in one direction, and a data line 13 is formed to cross the gate line 11. A thin film transistor (TFT) 15 and a pixel electrode 17 are formed at a crossing point of the gate line 11 and the data line 13. The TFT 15 uses a part of the gate line 11 as a gate electrode 15a, and uses a part of the data line 13 as a source electrode 15b and a drain electrode 15c. A pixel electrode 17 is connected to the drain electrode 15c through a contact hole (not shown). Meanwhile, a storage capacitor 19 for maintaining a signal voltage applied to an LC is formed by overlapping the pixel electrode 17 with a part of an adjacent gate line 11a with a gate insulating film (not shown) interposed therebetween.

A related art LCD device will be explained in more detail with reference to FIG. 2.

FIG. 2 is a sectional view of a related art LCD device, taken along line I-I' of FIG. 1.

As shown in FIG. 2, aluminum(Al), chromium(Cr), Molybdenum(Mo), and Al alloy are formed on a first substrate 1 by a sputtering method. Then, a gate line (not shown), a gate electrode 15a of a TFT, and a storage capacitor electrode 19a are formed with constant intervals by a photolithography process. Subsequently, a gate insulating film 21 consisting of $SiO_x$ or $SiN_x$ is formed on the first substrate 1 including the storage capacitor electrode 19a by Plasma Enhanced Chemical Vapor Deposition (PECVD). Then, a semiconductor layer 23 and an ohmic contact layer 23a used as channel layers of the TFT are layered on the gate insulating film 21 corresponding to an upper portion of the gate electrode 15a.

Then, Al, Cr, Mo, and Al alloy are formed on the gate insulating film 21 including the semiconductor layer 23 and the ohmic contact layer 23a by a sputtering method, and patterned to form a data line and source electrode 15b and drain electrode 15c, and a metal layer 25 on the gate insulating film 21 corresponding to an upper portion of the storage capacitor electrode 19a.

Subsequently, a passivation film 27 is formed on an entire surface including the source and drain electrodes 15b and 15c, and the metal layer 25. Then, a contact hole is formed to expose surfaces of the drain electrode 15c and the metal layer 25. A pixel electrode 17 electrically connected to the drain electrode 15c and the metal layer 25 through the contact hole is formed, thereby completing a method for manufacturing a TFT substrate.

Meanwhile, a color filter substrate opposed to the TFT substrate is formed by the following processes.

A color filter substrate consists of Red (R), green (G), and blue (B) color filter patterns 29 for displaying colors red, green, and blue, a black matrix 31 for dividing the respective color filter patterns 29 and shielding light, and a common electrode 33 for applying a voltage to an LC.

The black matrix 31 generally placed among the color filter patterns 29 is formed to shield a reverse tilted domain formed at a part where the pixel electrode 17 is not formed and around the pixel electrode 17.

Also, the black matrix 31 is formed to prevent leakage current of the TFT from being increased by shielding the irradiation of direct light to the TFT 15.

The black matrix 31 is formed of either a metal thin film such as Cr or a carbon based organic material. Also, the black matrix 31 may have a double layered-film structure of Cr/CrOx for low reflection.

After forming the black matrix 31, color filter patterns 29 for displaying colors are formed using a photo-process. At this time, the Red (R), green (G), and blue (B) color filter patterns 29 are generally formed by shifting one mask.

Subsequently, the common electrode 33 is formed for driving an LC with the pixel electrode 17 formed on the TFT substrate. The common electrode 33 is formed of Indium Tin Oxide (ITO) material from a of transparent electrode having excellent permeability, conductivity, and chemical and thermal stability by a sputtering method.

Meanwhile, although not shown, before forming the common electrode 33, an over coat layer may be formed of acryl based resin or polyimide based resin to protect and planarize the color filter patterns 29.

After the TFT substrate and the color filter substrate are manufactured as above, the two substrates are sealed and then an liquid crystal (LC) layer 100 is formed between the two substrates, thereby completing the related art LCD device.

However, the related art LCD device has the following problems.

A storage capacitor is formed by overlapping a gate line and a pixel electrode adjacent to each other. In the related art, since an overlapped area between the pixel electrode and the gate line is large, an aperture ratio is decreased.

To prevent decrease of the aperture ratio, there is a method for decreasing a width of a gate line. However, since a desired capacitance cannot be obtained in a case of decreasing the width of the gate line, there was a limit in decreasing the width of the gate line.

SUMMARY OF THE INVENTION

Accordingly, the present invention is directed to an LCD device and a method for manufacturing the same that substantially obviates one or more problems due to limitations and disadvantages of the related art.

An advantage of the present invention is to provide an LCD device and a method for manufacturing the same in which a storage capacitor having high capacitance with a small area is formed to decrease a width of a gate line, thereby improving an aperture ratio and thus obtaining high picture quality.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, an LCD device includes a first substrate defined by first and second regions; a storage capacitor electrode and a gate electrode respectively formed in the first and second regions of the first substrate; a gate insulating layer formed on an entire surface of the first substrate so that the first region is thinner than the second region; a semiconductor layer and source and drain electrodes deposited on the gate insulating layer of the second region, a conductive layer formed on the gate insulating layer of the first region; a pixel electrode electrically connected to the drain electrode and the conductive layer; a second substrate opposite to the first substrate; and an LC layer formed between the first and second substrates.

In another aspect of the present invention, a method for manufacturing an LCD device includes preparing a first substrate defined by first and second regions; forming a storage capacitor electrode in the first region of the first substrate; forming a gate electrode in the second region; forming a gate insulating layer on an entire surface of the first substrate so that the first region is thinner than the second region; forming a semiconductor layer and source and drain electrodes on the gate insulating layer of the second region, forming a conductive layer on the gate insulating layer of the first region; forming a pixel electrode electrically connected to the drain electrode and the conductive layer; and forming an LC between the first and second substrates opposite to each other.

In another embodiment of the present invention, a storage capacitor having a high capacitance with a small area is formed, so that a width of a gate line can be decreased compared with the related art, and an aperture ratio can be improved as much as the decreased width, thereby obtaining an LCD device of high picture quality.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 3:
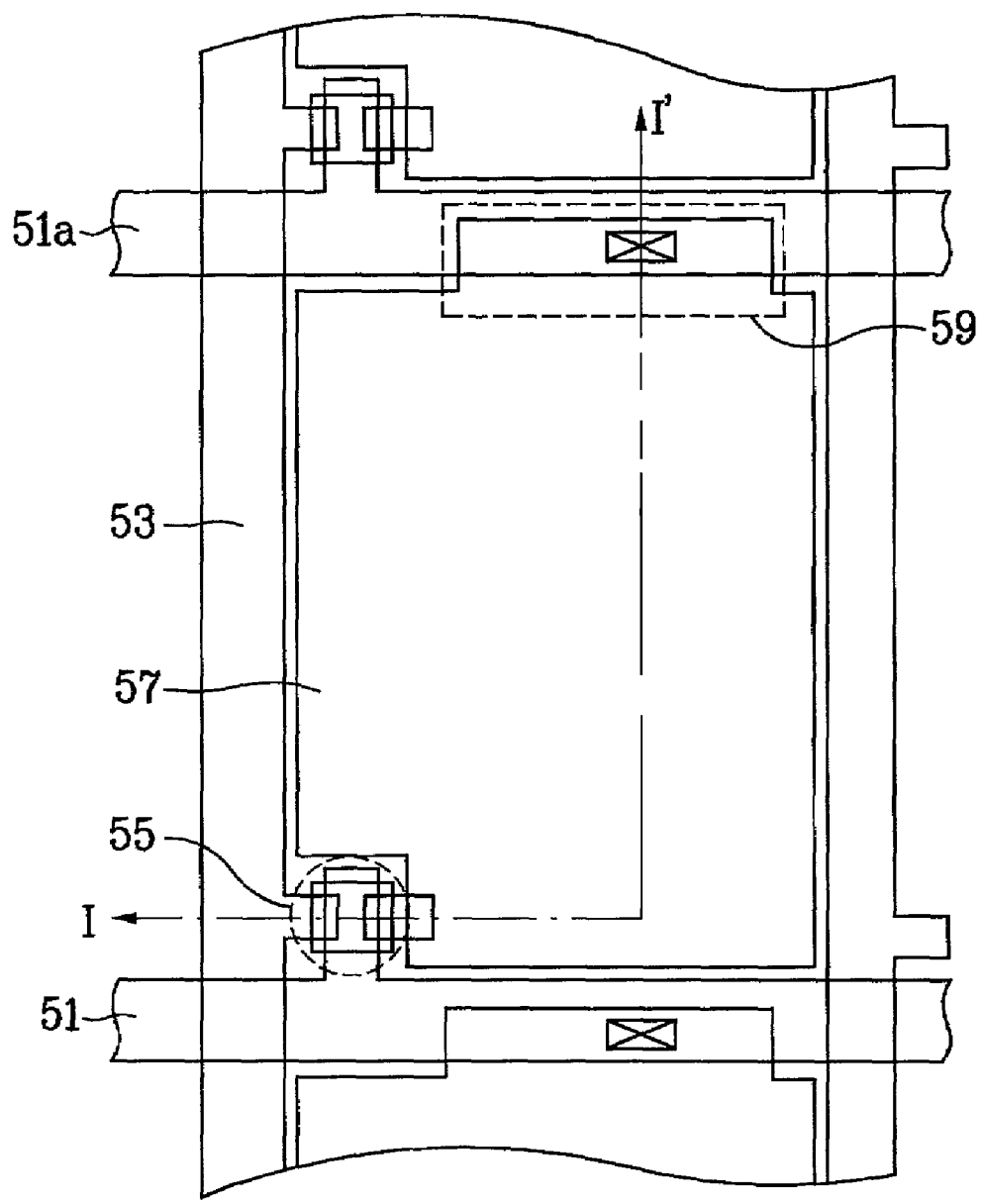
FIG. 3 is a plan view of an LCD device according to the present invention.

FIG. 3 is a plan view of an LCD device according to the present invention.

As shown in FIG. 3, an LCD device of the present invention includes a gate line 51 and a data line 53 arranged to cross each other and to define a pixel region; a thin film transistor (TFT) 55 formed on a crossing region of the gate line 51 and the data line 53; a pixel electrode 57 formed in the pixel region; and a storage capacitor 59 formed by an overlap between the pixel electrode 57 and a gate line 51a adjacent to the pixel electrode 57.

Figure 1:
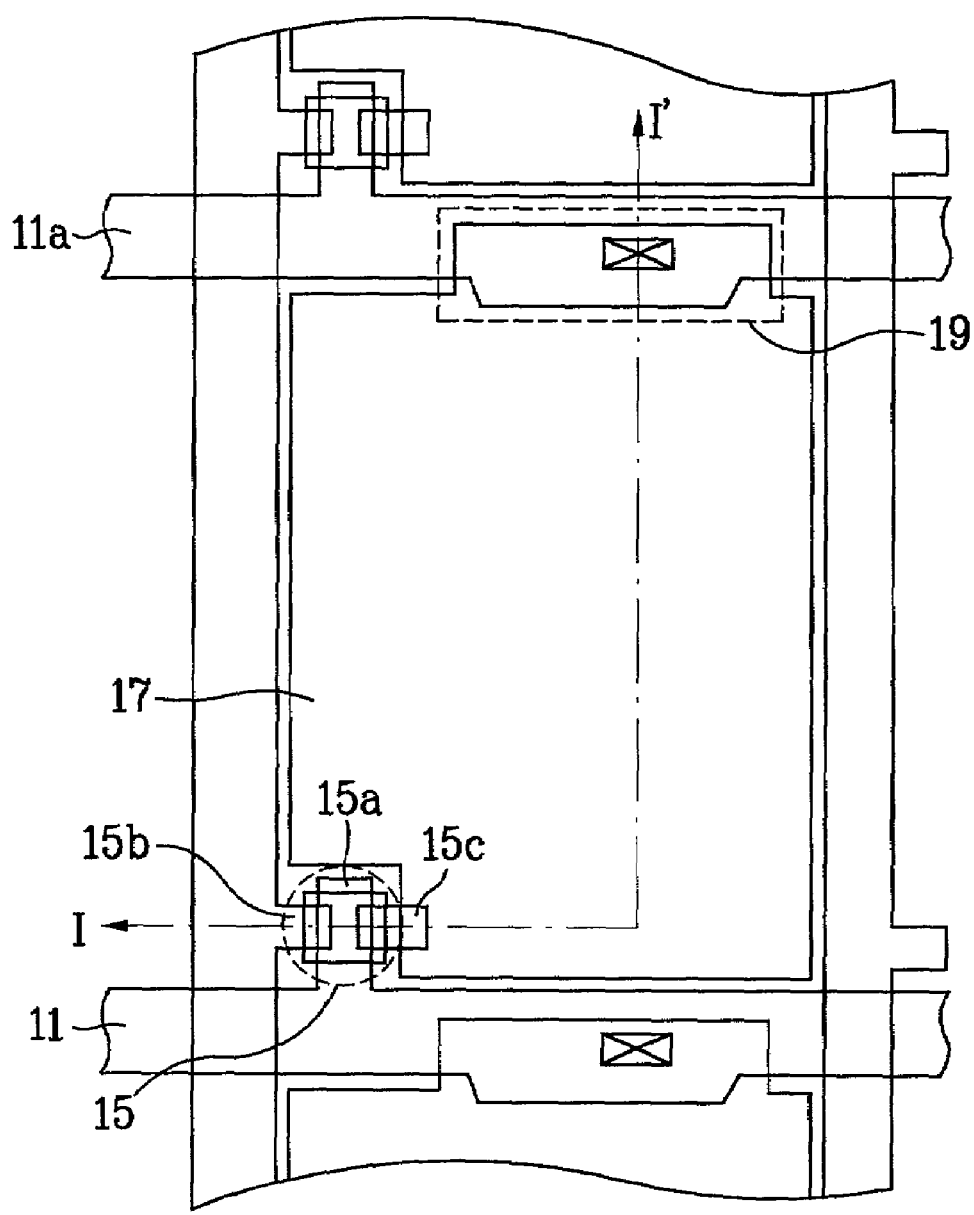
FIG. 1 is a plan view of a related art LCD device.
Figure 2:
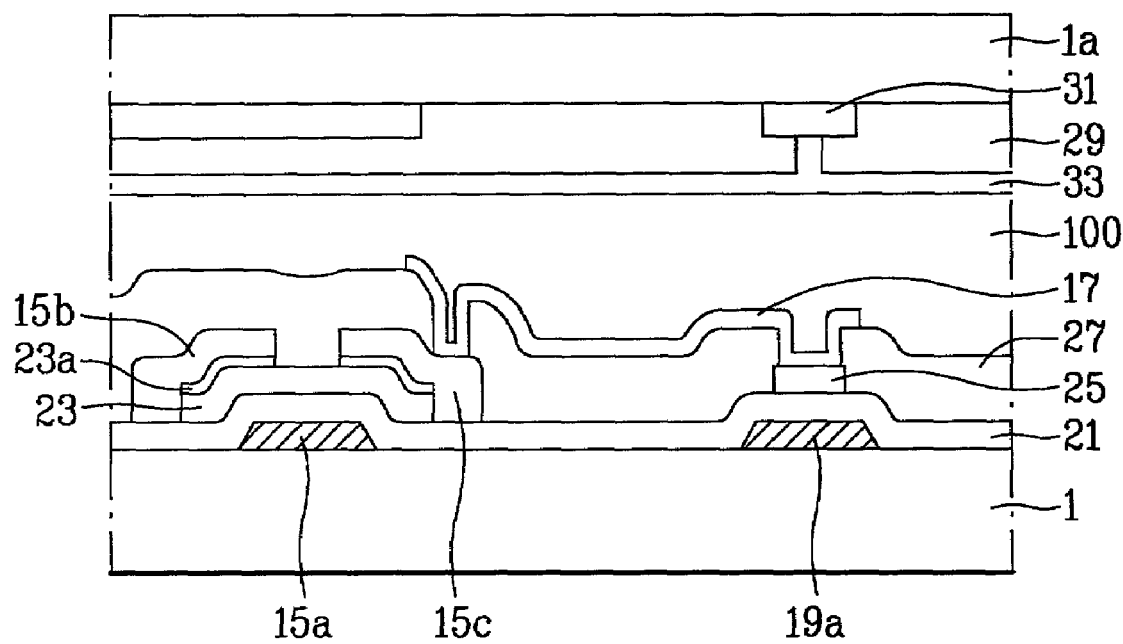
FIG. 2 is a sectional view taken along line I-I' of FIG. 1.

The gate line 51a has a decreased width compared with the related art shown in FIG. 1. In the present invention, an aperture ratio can be improved as much as the decreased width.

In the present invention, the width of the gate line can be decreased because the storage capacitor has high capacitance with a small area.

Whereas there was a limit in decreasing a width of a gate line to obtain a high capacitance of a storage capacitor in the related art, a storage capacitor of high capacitance can be obtained in the present invention by decreasing a thickness of a gate insulating layer between a storage capacitor electrode 59 and a conductive layer.

Hereinafter, embodiments of the present invention will be explained with reference to the accompanying drawings.

Figure 4:
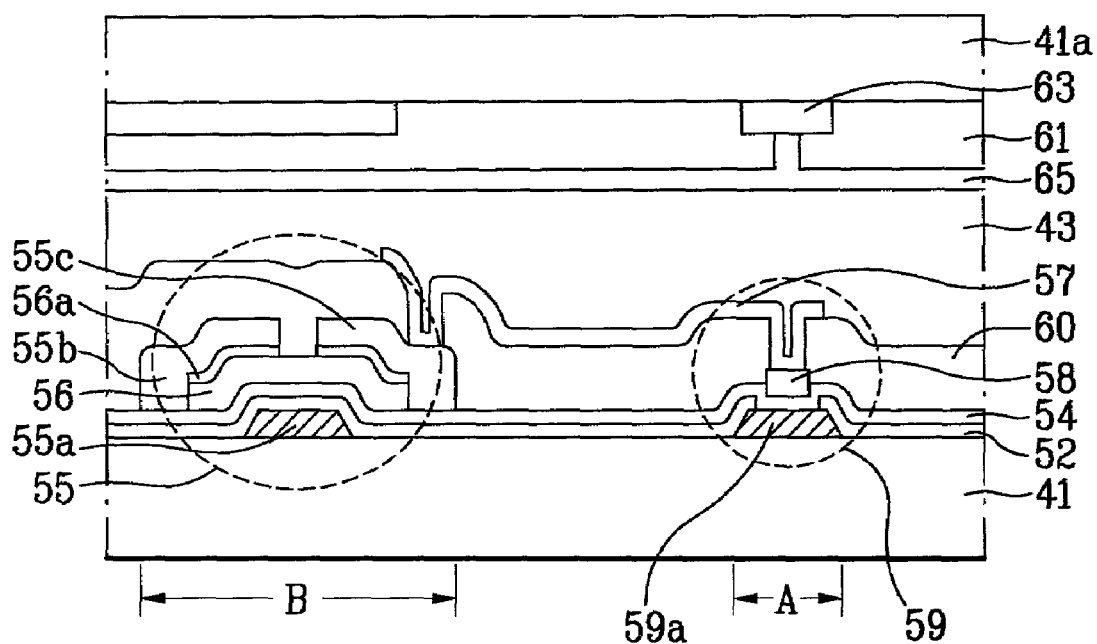
FIG. 4 is a sectional view of an LCD device according to a first embodiment of the present invention.

FIG. 4 is a sectional view of an LCD device according to a first embodiment of the present invention, taken along line I-I' of FIG. 3.

Referring to FIG. 4, the LCD device according to the first embodiment of the present invention includes a storage capacitor region (first region) and a TFT region (second region). As shown in FIG. 4, the LCD device includes a first substrate 41, a second substrate 41a, and an LC layer 43 formed between the two substrates. A storage capacitor 59 is formed in a first region A of the first substrate 41, and a TFT 55 is formed in a second region B of the first substrate 41.

Hereinafter, the first region A and the second region B will now be explained in more detail.

A gate electrode 55a for a TFT 55 and a storage capacitor electrode 59a spaced apart from the gate electrode 55a are formed on the first substrate 41.

A first insulating layer 52 is formed on an entire surface of the first substrate 41 except an upper portion of the storage capacitor electrode 59a. Also, a second insulating layer 54 is formed on the first insulating layer 52 and the storage capacitor electrode 59a.

At this time, the second insulating layer 54 has a thickness in a range of about 100 Å~4000 Å.

A semiconductor layer 56 is formed above the second insulating layer 54 in the second region B used as a channel of the TFT. Also, a source electrode 55b and a drain electrode 55c opposing each other are formed above the semiconductor layer 56. A conductive layer 58 of the same material as the source and drain electrodes 55b and 55c is formed on the second insulating layer 54 in the first region A. At this time, an ohmic contact layer 56a is further formed at an interface between the source and drain electrodes 55b and 55c and the semiconductor layer 56. The ohmic contact layer 56a serves to improve ohmic contact.

A passivation layer 60 having a contact hole is formed on an entire surface including the conductive layer 58 and the source and drain electrodes 55b and 55c to expose upper portions of the drain electrode 55c and the conductive layer 58. Also, a pixel electrode 57 is formed electrically connected to the drain electrode 55c and the conductive layer 58 through the contact hole.

A plurality of Red (R), green (G), and blue (B) color filter patterns 61 are formed on the second substrate 41a opposite to the first substrate 41. Also, a black matrix 63 of a light-shielding film for preventing light from being transmitted to a region other than the pixel electrode 57 formed on the first substrate 41 is formed among the color filter patterns 61.

A common electrode 65 for applying a voltage to an LC layer 43 is formed on the entire surface including the black matrix 63 and the color filter patterns 61. Also, before forming the common electrode 65, an over coat layer (not shown) is formed to protect and planarize the color filter patterns.

According to the aforementioned first embodiment of the present invention, the first insulating layer 52 and the second insulating layer 54 are deposited on the second region B where the TFT is formed, and only the second insulating layer 54 is formed on the first region A where the storage capacitor is formed. Therefore, the storage capacitor can obtain high capacitance with a small area.

A method for manufacturing an LCD device according to the first embodiment of the present invention will be explained with reference to FIGS. 5A to 5D.

Figure 5A:
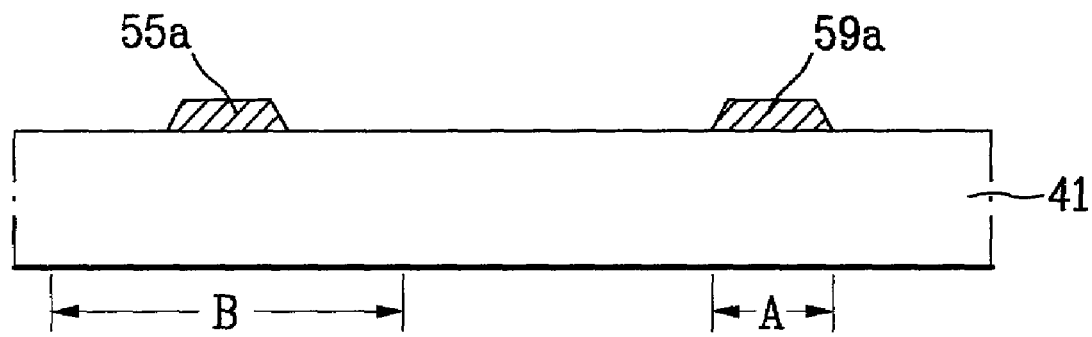
FIGS. 5A to 5D are sectional views illustrating a method for manufacturing an LCD device according to a first embodiment of the present invention.

As shown in FIG. 5A, a metal having a low resistance such as Al, Cr, Cu, Mo, and Al alloy is formed on the first substrate 41 by a sputtering method, and then the gate line (not shown), the gate electrode 55a, and the storage capacitor electrode 59a spaced apart from the gate electrode 55a are formed by a patterning process such as photo-lithography.

Figure 5B:
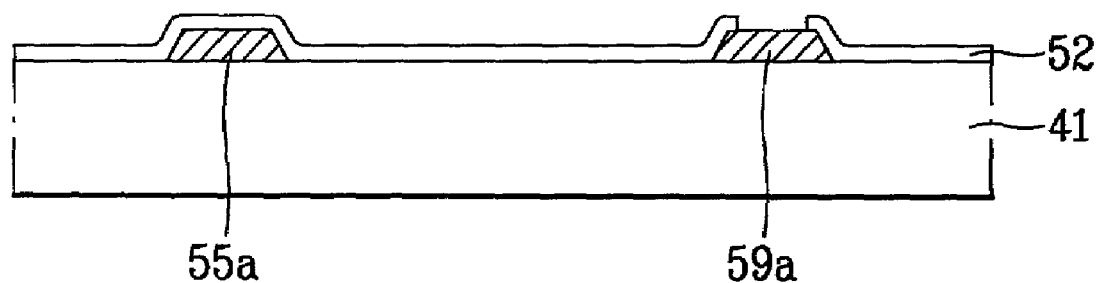

Subsequently, as shown in FIG. 5B, the first insulating layer 52 is formed on the entire surface of the first substrate 41 including the storage capacitor electrode 59a. Then, the first insulating layer 52 above the storage capacitor electrode 59a is eliminated by the following process.

A photoresist material is deposited on the first insulating layer 52, and then patterned by exposure and developing processes to expose the first insulating layer 52 on the storage capacitor electrode 59a. Subsequently, the first insulating layer 52 is etched by an etching process using the patterned photoresist material as a mask to expose an upper portion of the storage capacitor electrode 59a.

Figure 5C:
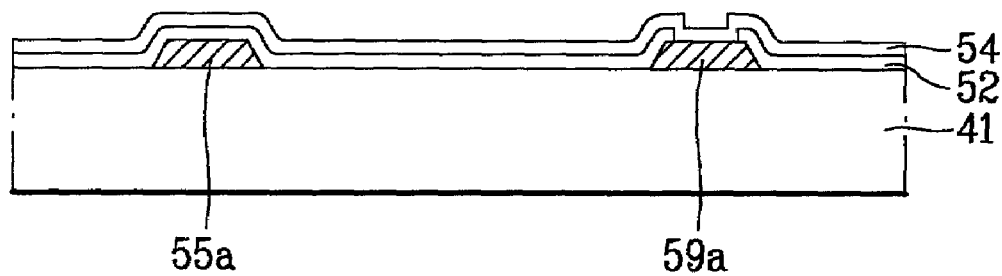

Then, as shown in FIG. 5C, the second insulating layer 54 is formed with a thickness in a range of about 100 Å~4000 Å on the first insulating layer 52 including the exposed storage capacitor electrode 59a.

Accordingly, the gate insulating layer of the second region B where the TFT is formed consists of a double film with the first and second insulating layers 52 and 54, and the gate insulating layer of the first region A where the storage capacitor is formed consists of a single layer of the second insulating layer 54. Therefore, as a whole, sufficient thickness of the gate insulating layer of the TFT can be obtained, and at the same time, the storage capacitor can be designed with high capacitance.

Figure 5D:
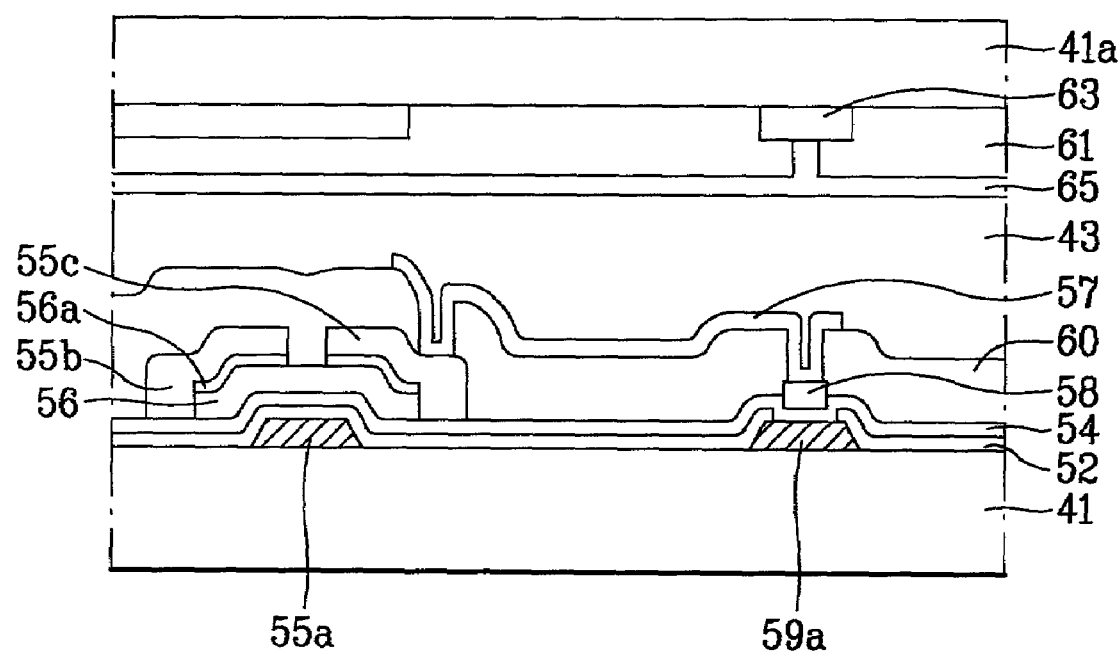

Subsequently, as shown in FIG. 5D, the semiconductor layer 56, the ohmic contact layer 56a, and the source and drain electrodes 55a and 55c are formed on the second insulating layer 54 of the second region B. Also, the conductive layer 58 of the same material as the source and drain electrodes 55b and 55c is formed on the second insulating layer 54 of the first region A.

Subsequently, the passivation layer 60 is formed on the entire surface including the conductive layer 58, and then a contact hole is formed to expose the drain electrode 55c and the conductive layer 58 by a photo-etching process. The pixel electrode 57 electrically connected to the drain electrode 55c and the conductive layer 58 through the contact hole is formed.

Then, the LC layer is formed between the first and second substrates 41 and 41a opposite to each other, thereby completing the manufacturing process of the LCD device according to the first embodiment of the present invention.

On the second substrate 41a, the Red (R), green (G), and blue (B) color filter patterns 61 for displaying colors, the black matrix 63 for dividing the respective color filter patterns and preventing light from being transmitted, and the common electrode 65 for applying a voltage into the LC are formed.

The black matrix 63 generally placed among the color filter patterns 61 is formed to shield a reverse tilted domain, which is formed at a part where the pixel electrode 57 is not formed and around the pixel electrode 57.

Also, the black matrix 63 is formed to prevent leakage current of the TFT from being increased by shielding the irradiation of direct light to the TFT.

The black matrix 63 is formed of either a metal thin film such as Cr, or a carbon-based organic material. Also, for low reflection, a double-layered structure with Cr and CrO, or a three-layered film structure where another CrO is interposed between Cr and CrO may be applied.

After forming the black matrix 63, the color filter patterns 61 for displaying colors are formed using a photo-process. At this time, the Red (R), green (G), and blue (B) color filter patterns are generally formed by shifting one mask.

Subsequently, the common electrode 65 is formed to drive an LC with the pixel electrode 57 formed on the TFT substrate. At this time, the common electrode 65 is formed from a transparent electrode material such as ITO having excellent permeability, conductivity, and chemical and thermal stability by a sputtering method.

Meanwhile, although not shown, before forming the common electrode 65, the over coat layer may be formed of acryl based resin or polyimide based resin to protect and planarize the color filter patterns 61.

Figure 6:
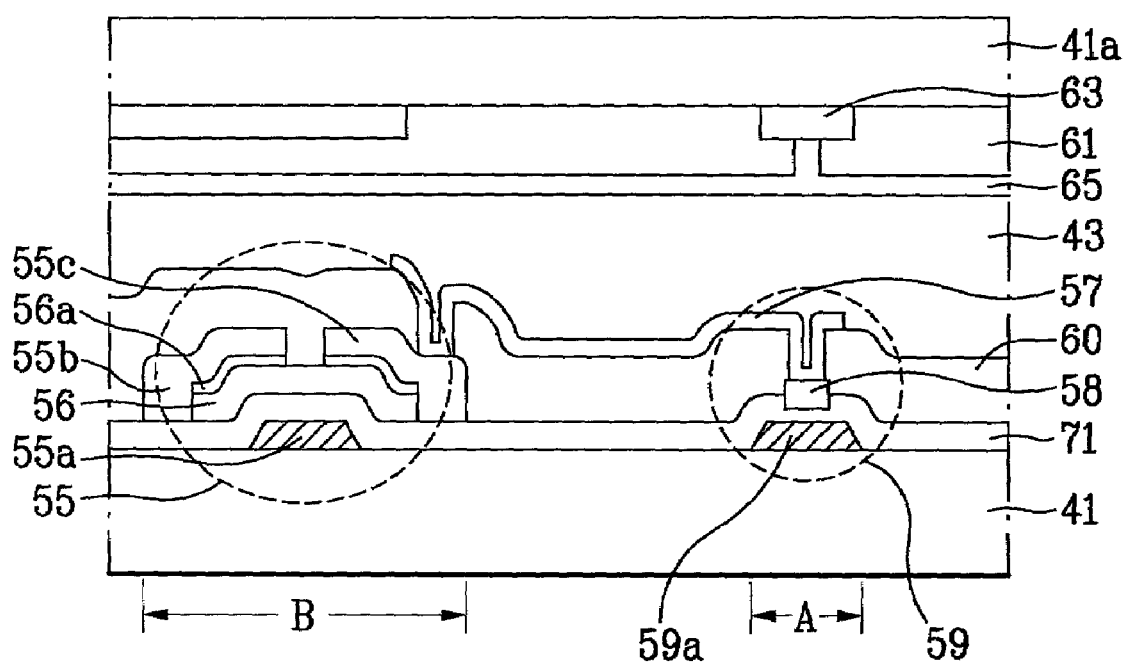
FIG. 6 is a sectional view of an LCD device according to a second embodiment of the present invention.

FIG. 6 is a structural sectional view of an LCD device according to a second embodiment of the present invention. As shown in FIG. 6, the LCD device according to the second embodiment of the present invention includes a first substrate 41, a second substrate 41a, and an LC layer 43 formed between the two substrates. A storage capacitor 59 is formed in a first region A of the first substrate 41. Also, a TFT 55 is formed in a second region B.

A gate electrode 55a for a TFT and a storage capacitor electrode 59a are formed on the first substrate 41. The storage capacitor electrode 59a is spaced apart from the gate electrode 55a.

An insulating layer 71 is formed on an entire surface including the storage capacitor electrode 59a. On the insulating layer 71, a part where the storage capacitor electrode 59a is formed thinner than a part where the gate electrode 55a is formed.

This can be obtained by etching the insulating layer 71 above the storage capacitor electrode 59a at a predetermined depth. Also, a thickness of the insulating layer 71 remaining above the storage capacitor electrode 59a is maintained at about 4000 Å or below by controlling its etching speed.

A semiconductor layer 56 used as a channel of a TFT is formed on the insulating layer 71 of the second region B. Also, source and drain electrodes 55b and 55c opposing each other are formed on the semiconductor layer 56. A conductive layer 58 of the same material as the source and drain electrodes 55b and 55c is formed on the insulating layer 71 of the first region A. At this time, an ohmic contact layer 56a is further formed at an interface between the source and drain electrodes 55b and 55c and the semiconductor layer 56 to improve an ohmic contact.

A passivation film 60 having a contact hole is formed on an entire surface including the conductive layer 58 and source and drain electrodes 55b and 55c to expose upper portions of the drain electrode 55c and the conductive layer 58. A pixel electrode 57 electrically connected to the drain electrode 55c and conductive layer 58 through the contact hole is formed.

A method for manufacturing the LCD device according to the second embodiment of the present invention will be explained with reference to FIGS. 7A to 7D.

First, in the second embodiment of the present invention, another method for manufacturing an LCD device is proposed to obtain a high aperture ratio by making a gate insulating layer of a storage region thinner than a gate insulating layer of a TFT region.

Figure 7A:
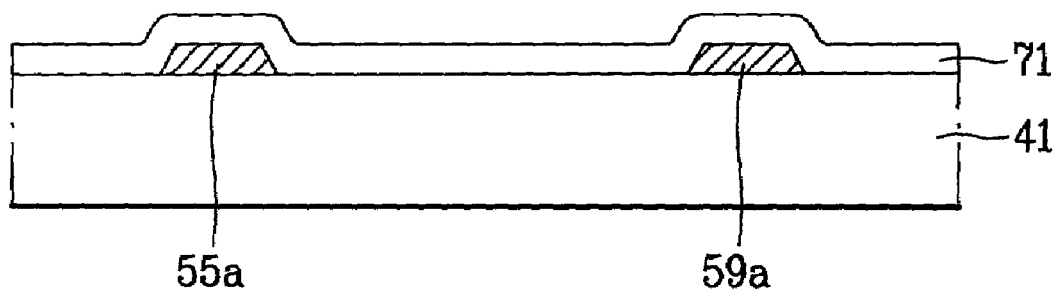
FIGS. 7A to 7D are sectional views illustrating a method for manufacturing an LCD device according to a second embodiment of the present invention.
Figure 7B:
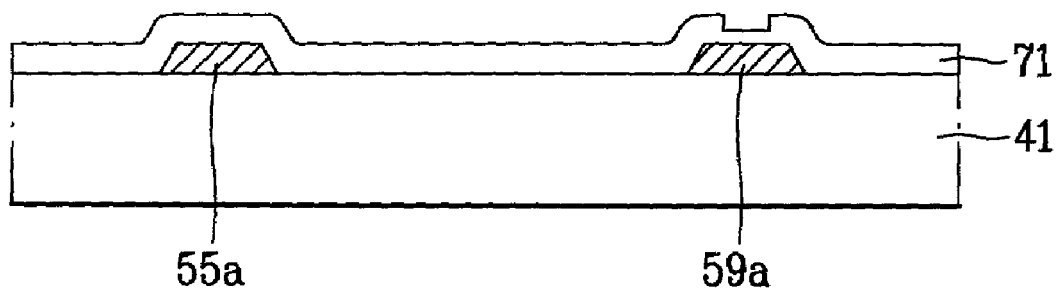

As shown in FIG. 7A, a metal having low specific resistance such as Al, Cr, Cu, Mo, and Al alloy is formed by a sputtering method, and then the gate line (not shown), the gate electrode 55a, and the storage capacitor electrode 59a spaced apart from the gate electrode 55a are formed by a patterning process using a photo-lithography process etc. Subsequently, an insulating layer 71 is formed on the entire surface of the first substrate 41 including the storage capacitor electrode 59a. Then, as shown in FIG. 7B, the insulating layer 71 above the storage capacitor electrode 59a is etched at a predetermined depth using a photoetching process.

At this time, a thickness of an insulating layer 71 remaining above the storage capacitor electrode 59a is maintained at about 4000 Å or below by controlling its etching speed.

Figure 7C:
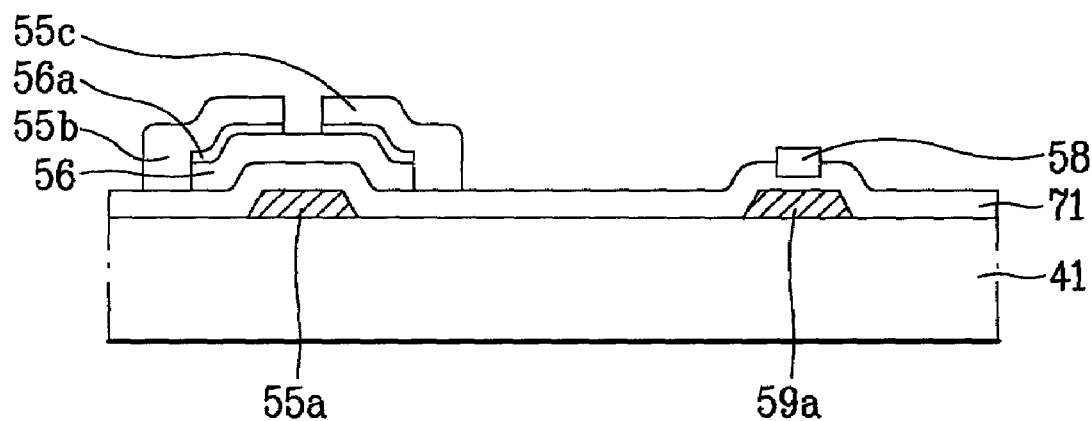

Then, as shown in FIG. 7C, a semiconductor layer 56 is formed on the insulating layer 71 above the gate electrode 55a. Also, source and drain electrodes 55b and 55c opposing each other are formed above the semiconductor layer 56. At this time, a conductive layer 58 of the same material as the source and drain electrodes 55b and 55c is formed on the insulating layer 71 above the storage capacitor electrode 59a.

Figure 7D:
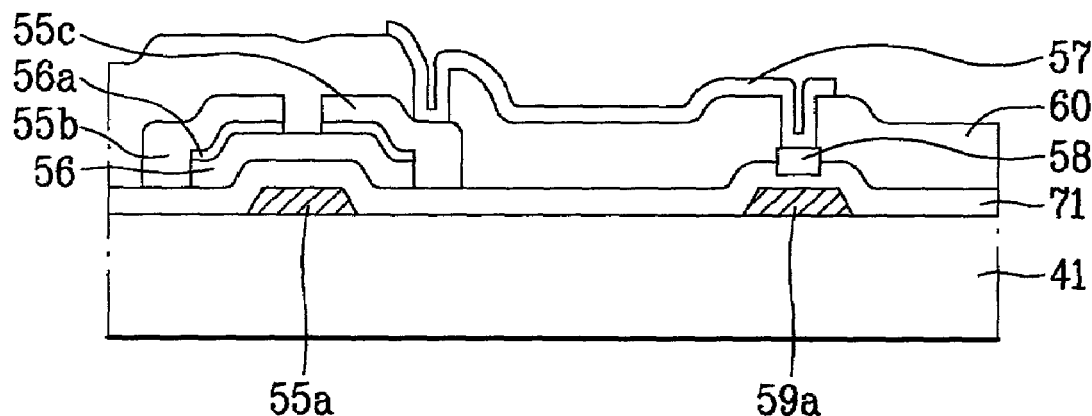

Subsequently, as shown in FIG. 7D, a passivation film 60 is formed on an entire surface including the conductive layer 58. Then, a part of the passivation film 60 is eliminated to expose the drain electrode 55c and conductive layer 58, so that a contact hole is formed. A pixel electrode 57 electrically connected to the drain electrode 55c and the conductive layer 58 through the contact hole is then formed, thereby completing a TFT substrate.

Finally, although not shown, an LC layer 43 is formed between the first substrate 41 corresponding to the TFT substrate and the second substrate 41a corresponding to a color filter substrate opposite to the first substrate 41, thereby completing a method for manufacturing an LCD device according to the second embodiment of the present invention.

As aforementioned, the LCD device and the method for manufacturing the same of the present invention have the following advantages.

The width of the gate line can be reduced by forming the storage capacitor with high capacitance in a small area, so that an aperture ratio can be improved, thereby providing an LCD device of high picture quality.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A liquid crystal display (LCD) device comprising:
a first substrate;
a second substrate;
a liquid crystal layer formed between the first and second substrates;
a storage capacitor formed in a first region of the first substrate;
a thin film transistor formed in a second region of the first substrate;
a gate electrode for the thin film transistor and a storage capacitor electrode spaced apart from the gate electrode, both formed on the first substrate;
a first insulating layer formed on an entire surface of the first substrate except an upper portion of the storage capacitor electrode;
a second insulating layer formed on the first insulating layer and the storage capacitor electrode;
a conductive layer formed on the second insulating layer in the first region overlapping the storage capacitor electrode except both side portions of the storage capacitor electrode in the first region and formed of the same material as a drain electrode of the thin film transistor; and
a pixel electrode electrically connected to the conductive layer and a drain electrode of the thin film transistor,
wherein the width of the conductive layer is shorter than the width of the storage capacitor electrode, and
wherein the storage capacitor is formed by overlapping between the conductive layer connected to the pixel electrode and the storage capacitor electrode connected to the gate line, and the only second insulating layer is disposed between the conductive layer and the storage capacitor electrode.

2. The liquid crystal display device as claimed in claim 1, wherein the second insulating layer has a thickness in a range of about 100 Å~4000 Å.

3. The liquid crystal display device as claimed in claim 1, further comprising a semiconductor layer formed above the second insulating layer in the second region and used as a channel of the thin film transistor.

4. The liquid crystal display device as claimed in claim 3, further comprising a source electrode and the drain electrode opposing each other and formed above the semiconductor layer.

5. The liquid crystal display device as claimed in claim 4, further comprising an ohmic contact layer formed at an interface between the source and drain electrodes and the semiconductor layer.

6. The liquid crystal display device as claimed in claim 4, further comprising a passivation layer having a contact hole and formed on an entire surface including the conductive layer and the source and drain electrodes to expose upper portions of the drain electrode and the conductive layer.

7. The liquid crystal display device as claimed in claim 6, wherein the pixel electrode electrically connects to the drain electrode and the conductive layer through the contact hole.

8. The liquid crystal display device as claimed in claim 1, further comprising a plurality of Red (R), green (G), and blue (B) color filter patterns formed on the second substrate opposite to the first substrate.

9. The liquid crystal display device as claimed in claim 8, further comprising a black matrix of a light-shielding film for preventing light from being transmitted to a region other than the pixel electrode and formed on the first substrate and formed among the color filter patterns.

10. The liquid crystal display device as claimed in claim 9, further comprising a common electrode for applying a voltage to a liquid crystal layer and formed on the entire surface including the black matrix and the color filter patterns.

\* \* \* \* \*